Patented July 27, 1943

2,325,562

UNITED STATES PATENT OFFICE 2,325,562

PLASTIC ADHESIVE

Herman E. Wening, Dayton, Ohio, assignor to General Motors Corporation, Detroit, Mich., a corporation of Delaware No Drawing. Application December 18, 1939, Serial No. 309,827

1 Claim. (Cl. 260—744)

This invention relates to plastic adhesives and is particularly concerned with water dispersed plastic adhesives.

It is an object of the invention to provide a plastic adhesive which is resistant to elevated temperatures and which, when used as a cement between two surfaces, holds the surfaces in intimate contact with one another even though the ambient conditions of temperature are substantially high.

In carrying out the above object it is a further object to provide a tack producing material to be used in the adhesive which is not substantially softened at the relatively high temperatures encountered.

A further object is to provide a plastic adhesive wherein the color of the adhesive may be controlled by choosing suitable reenforcing pigments which are of the color desired.

A still further object is to provide a water dispersed plastic adhesive which remains in stable suspension for long periods of time without settling or coagulation thereof.

In carrying out the above object it is a further object of the invention to utilize a peptizing agent in the general class of water soluble colloids, such a peptizing agent preferably being casein or glue.

It is a further object to provide a method whereby the adhesive mentioned in the above objects can be suitably compounded.

Further objects and advantages of the present invention will be apparent from the following description.

Water dispersed plastic adhesives are very desirable in production work since they are non-inflammable and may be sprayed or brushed on the surfaces of application and thereby reduce production costs. Such adhesives can be made in any desired consistency by the addition of water so as to function properly in accordance with the particular apparatus used for their application.

In the past, water dispersed adhesives have been made by utilizing asphalt or other bitumens as a tack producing material. The asphalt is milled in with the rubber and gives the rubber sufficient tack to stick to the surfaces when applied thereto. Bitumens have a tendency to soften upon elevation of the ambient temperature and thereby weaken the adhesive bond and thus permit articles associated by the cement to fall apart or slip, if a shear pull is applied, so that the relative placement thereof is changed. Also the adhesive is always black or dark brown due to the color of the bitumen. It is apparent that this type of adhesive therefor is unsuited for use in applications where elevated temperatures are encounted or where light colored adhesives are desirable. One of such applications is in connection with automobile bodies wherein it is desirable to spray a water dispersed plastic adhesive on the inside of the body and then apply a sound deadening felt thereto. In this application the adhesive must be of sufficient strength to hold the felt in position under any and all weather conditions as well as in touch-up ovens during production. It has been noted that when the automobile is used throughout the year that temperatures are encountered ranging from many degrees below zero to 50–60° C. under normal conditions whereas in ovens it may go as high as 100° C. This wide variation in temperature places a demand upon the cement wherein the cement must not be highly brittle at the low temperatures and must not be substantially softened at the high. A test which is imposed on cements of this character and used for this purpose is to attach a piece of fabric to a sheet of metal by means of the cement and then apply a 500 gram shear pull to the fabric while maintaining the entire assembly at a temperature of 93° C. If the cement is suitable for the purpose it will not permit slipping of the fabric or disengagement thereof.

The base of my improved plastic adhesive is compounded rubber, or compounded rubber and reclaimed rubber, or reclaimed rubber, etc. The rubber material is reenforced with suitable pigments which likewise may act as coloring agents, such pigments falling within the following class: whiting, clay, carbon black, iron oxide, yellow ochre or whiting, zinc oxide, etc., with an organic dye. The rubber and reenforcing agent are mixed with a saponifiable material such as an oil, resin, ester gum, pine tar or one of the higher fatty acids such as stearic oleic or palmitic acid, all of these latter materials being capable of forming water soluble soaps when an alkali, such as sodium or potassium hydroxide is added thereto in the presence of water. This mixture is worked together in a Werner-Pfeiderer type mixer with suitable tack producing materials, such as pine tar, para-cumarone, mineral oil, rosin or ester gum, etc., for forming a plastic adhesive. The material at this stage of the compounding is an adhesive of a thick gummy consistency and can be used as such. If it is desired to use a water dispersion of this adhesive, the plastic mass is kneaded with a diluted aqueous caustic solution whereupon the rubber particles including the reenforcing agent, tack producing agent, etc., are dispersed by means of the soap which is formed in situ when the saponifiable material is contacted by the caustic. Thus the particles of adhesive are held in suspension in the aqueous solution by means of the soap. This solution may be diluted with water to any desired consistency.

In order to prevent premature coagulation, or settling of the water dispersion of the plastic adhesive, it is desirable to add a peptizing agent which will hold the plastic adhesive in solution for long periods of time. Peptizing materials such as triethanolamine, glue, gum tragacanth or casein may all be used, but I prefer to use casein as a peptizing agent since casein satisfactorily maintains the particles in solution for long periods of time. Thus the water dispersed plastic is ready for use at any time without the necessity of stirring, or remixing, as is the case in many instances of adhesives of this general type.

It is apparent that the exact proportions of the various ingredients are of slight importance since these proportions may be varied within wide limits, the only necessary feature being that sufficient soap is formed to disperse the plastic adhesive in the aqueous vehicle. By varying the amount of tack producing material used the heat resistance and tack of the resultant adhesive may be controlled to any desired degree. Likewise the proportions of the reenforcing agent used may be varied to obtain any desired degree of strength according to the application for which it is to be used. For illustrative purposes only several formulas of cement which have proved satisfactory are given, but it should be understood that these formulas in no way limit the proportions of the ingredients to be used but show the wide variations possible.

|  | Formulas | | |
| --- | --- | --- | --- |
|  | #1 | #2 | #3 |
|  | Parts | Parts | Parts |
| Crude rubber | 3.0 | 2.0 | 1.0 |
| Reclaimed rubber | 6.5 | 9.0 | 10.0 |
| Carbon black | .5 | .6 |  |
| Iron oxide |  |  | 1.0 |
| Mineral oil | 2.0 |  | 4.0 |
| Ester gum | 10.5 | 11.5 | 7.5 |
| Resin | 1.5 | 1.0 |  |
| NaOH or KOH | .2 | .5 | .3 |
| Casein | .75 | 1.5 |  |
| Glue |  |  | 1.0 |
| Ammonia | .15 | .3 |  |
| Water | As required | | |

The ammonia mentioned above helps dissolve the casein and also acts as a preservative. However, its use is optional.

In the above formulas the crude rubber may be eliminated and substituted by reclaimed rubber, or the reclaimed rubber may be substituted by compounded rubber. The adhesives made in formulas #1 and #2 are black while #3 formula produces a red adhesive.

All of the proportions may be varied within wide limits but the proportions noted are preferred.

The water dispersed plastic adhesive as described herein is a material wherein the dispersed ingredient is in itself a plastic adhesive and which may be used as such without disperison, if desired. In other words, each particle of suspended material is composed of a plastic adhesive and the dispersion thereof in an aqueous vehicle is provided to make the handling thereof more facile and reduce the application problem heretofore experienced.

While the form of embodiment of the present invention as herein disclosed constitutes a preferred form, it is to be uderstood that other forms might be adopted, all coming within the scope of the claim which follows.

What is claimed is as follows:

A plastic adhesive rubber compound for providing non-slip cementation resistant of temperatures as high as 100° C., comprising: an aqueous dispersion containing from 9½ to 11 parts rubber, from 7½ to 12½ parts of a tack-producing material consisting essentially of an ester gum, a fractional part of a saponifying agent for said tack-producing material, and from ¾ of a part to 1½ parts of a peptizing agent for inhibiting coagulation of said rubber in said dispersion.

HERMAN E. WENING.